O. F. BUSCH.
WEEDER.
APPLICATION FILED OCT. 3, 1914.
1,161,109.
Patented Nov. 23, 1915.
2 SHEETS—SHEET 2.
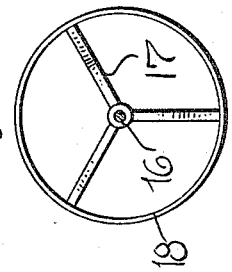
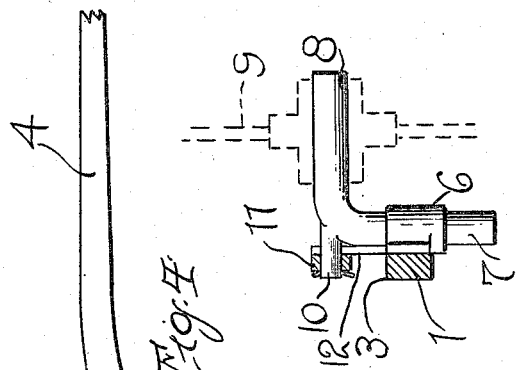
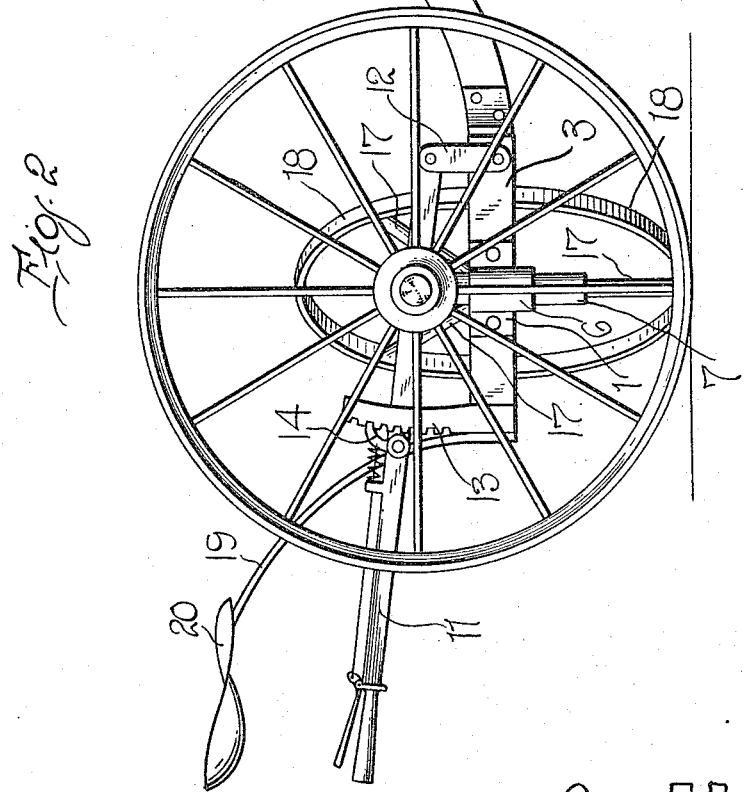
Inventor
OTTO F. BUSCH

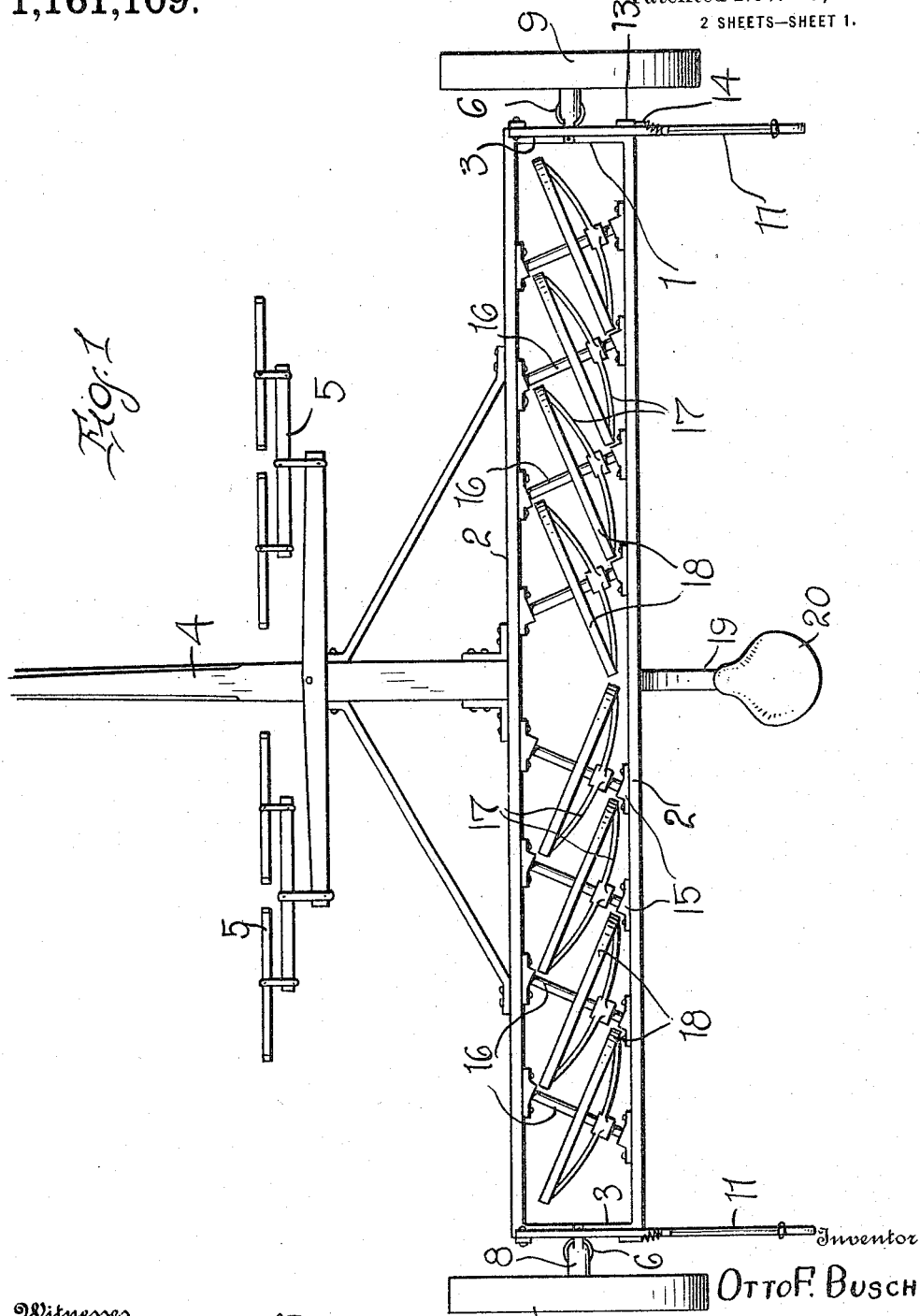

UNITED STATES PATENT OFFICE.

OTTO F. BUSCH, OF MARCELLUS, WASHINGTON.

WEEDER.

1,161,109.

Specification of Letters Patent. Patented Nov. 23, 1915.

Application filed October 3, 1914. Serial No. 864,864.

*To all whom it may concern:*

Be it known that I, OTTO F. BUSCH, a subject of the Emperor of Germany, residing at Marcellus, in the county of Adams and State of Washington, have invented certain new and useful Improvements in Weeders, of which the following is a specification, reference being had to the accompanying drawings.

This invention relates to improvements in farming implements, and relates particularly to a weeding machine.

An object of this invention is the provision of a weeder by means of which weeds may be readily cut from the ground, the weeder being extremely simple in construction, and durable and efficient in use.

A further object of this invention is the provision of a weeder which consists of a wheeled frame in which a plurality of cutting rims are rotatably mounted, the rims being supported on shafts by open spiders whereby minimum resistance is offered to the rims as the same are drawn through the ground to cut the weeds.

A still further object of this invention is the provision of a weeder of this character in which the cutting rims are arranged at an angle with relation to the direction of travel of the weeder, whereby the weeds are lifted or cut from the ground by the engagement of the cutting rims therewith.

With these and other objects in view, my invention consists in the novel construction, combination, and arrangement of parts, to be hereinafter more fully described, claimed, and illustrated in the accompanying drawing, in which—

Figure 1 is a top plan view of my improved weeder; Fig. 2 is a side elevational view thereof with the animal connecting means removed; Fig. 3 is an elevational view of one of the cutting rims; and Fig. 4 is a detail view showing the manner of adjustably supporting the frame on the axles.

Referring more particularly to the drawing, the numeral 1 designates a rectangular frame which comprises parallel front and rear bars 2 connected by end bars 3, the front bar 2 having a draft tongue 4 connected thereto upon which is mounted the usual animal attaching means 5. Connected to the end bars 3 are outwardly extending sleeves 6 through which the vertical portions 7 of stub axles 8 extend, the stub axles having supporting wheels 9 journaled thereon to support the frame in spaced relation from the ground. Extending inwardly from each axle 8 is a cylindrical stem 10 and pivotally mounted adjacent their forward ends upon the stems are levers 11, the forward ends of the levers being connected to the end bars 3 forwardly of the axle by links 12. Extending upwardly from the end bars at their rear ends are racks 13 and spring pressed pawls 14 are carried by the levers 11 for engagement with the racks, whereby the frame 1 may be supported in any desired vertical adjusted position with relation to the ground.

Mounted in bearings 15 carried by the parallel bars 2 of the frame are obliquely extending transversely spaced shafts 16. the shafts on opposite sides of the longitudinal center of the frame being arranged at opposite angles with relation to the direction of travel of the machine. The shafts 16 in opposite sides of the frame, extend from their rear ends inwardly toward the longitudinal center of the frame, and rotatably mounted on each shaft is a spider 17 upon the outer ends of the arms of which a cutting rim 18 is secured. Extending upwardly and rearwardly from the rear bar of the frame is a spring seat post 19 upon the upper end of which a suitable seat 20 is mounted for the operator of the weeder.

In the practical use of my device, the machine is drawn over the ground in the usual manner, with the height of the frame 1 adjusted to dispose the cutting rims the desired depth into the ground. As the cutting rims are disposed obliquely with relation to the direction of travel of the machine, the rims will be rotated automatically as the same are drawn through the ground, whereby the weeds will be either severed by the rims or lifted from the ground by the engagement of the rims beneath the same. As the rims are automatically rotated, and are disposed at an oblique angle, the weeds are cut with a slicing motion so that the least resistance is offered to the draft of the machine, and as the rims are disposed at opposite angles on opposite sides of the longitudinal center of the frame, the resistance of the rims will be equally distributed along the entire length of the frame so that the frame will always travel in a direction at right angles to the line of travel of the animals. It will further be seen that by connecting the cutting rims to the shaft by open spiders, the dirt and weeds cut by the rims may readily pass through the rims so that the dirt will not be dragged along by the machine as would otherwise occur were the rims connected to the shaft by solid spiders. When the rims are not desired for use, the frame may be readily elevated by reason of the slidable engagement of the sleeves 6 on the vertical portions of the stub shafts 8, the frame being maintained in its elevated position by the engagement of the pawls 6 with the racks 7.

Having thus fully described my invention, what I desire to claim and secure by Letters Patent is:—

1. In a weed cutting machine, a wheeled supporting frame, a plurality of freely rotatable shafts mounted thereon extending from front to rear of the frame, the shafts on each side of the line of draft being parallel to each other and converging toward the front of the machine, and cutters mounted upon and rotatable with the shafts and disposed in a plane at right angles thereto, each cutter having a radius nearly equal to the distance between the shaft on which it is mounted and the next adjacent shaft.

2. In a weed cutting machine, a wheeled supporting frame, a plurality of freely rotatable shafts mounted thereon extending from front to rear of the frame, the shafts on each side of the line of draft being parallel to each other and converging toward the front of the machine, and annular cutting members mounted on the shaft at right angles thereto, each cutting member having a radius nearly equal to the distance between the shaft on which it is mounted and the next adjacent shaft, the cutting members being mounted upon the shafts concentrically to its axis.

3. In a weed cutting machine, a rectangular frame, wheels supporting the frame, a plurality of freely rotatable shafts mounted upon the frame extending from front to rear thereof, the shafts on each side of the line of draft being parallel to each other and converging toward the front of the machine, and rotatable cutting members mounted upon the shafts and disposed in a plane at right angles thereto, each cutting member comprising radial spokes and an annular cutting rim, the rim being disposed concentric to its axis, each cutting member having a radius nearly equal to the shaft on which it is mounted and the next adjacent shaft, one cutting member overlapping the next adjacent cutting member on the same side of the line of draft.

In testimony whereof I hereunto affix my signature in the presence of two witnesses.

OTTO F. BUSCH.

Witnesses:
JOHN H. LUITEN,
ALFRED LUITEN.

Copies of this patent may be obtained for five cents each, by addressing the "Commissioner of Patents, Washington, D. C."